Patented Mar. 1, 1949

2,462,835

UNITED STATES PATENT OFFICE 2,462,835

FLY SPRAY

Harold W. Arnold and Norman E. Searle, Wilmington, Del., assignors to E. I. du Pont de Nemours & Company, of Wilmington, Del., a corporation of Delaware No Drawing. Application September 3, 1943, Serial No. 501,133

5 Claims. (Cl. 167—24)

This invention relates to pest control and is particularly directed to methods and compositions for preventing or arresting infestations of insects which are economically harmful to man and which commonly infest organic matter whether plant or animal or of plant or animal origin either in its natural, fabricated or synthetic state.

The need and desirability of having a truly synthetic, organic pest control agent has long been recognized in the art and much research has been carried out for the purpose of discovering such agents. That such research has been only partially effective in accomplishing its object is amply illustrated in the present emergency by our dependency upon imported materials such as rotenone products and pyrethrum products.

We have now found that control of insect pests can be obtained by bringing into contact with the pest a toxic amount of a tertiary diacyl amine.

Tertiary diacyl amines belong to the broad class of trivalent tri-substituted nitrogen compounds. They are imides of primary amines. They specifically distinguish from secondary diacyl amines, which are the unsubstituted imides, by not having the N-hydrogen which is highly activated by reason of its position, alpha to two strongly negative groups. The tertiary diacyl amines are characterized by two acyl groups satisfying two valences of a trisubstituted nitrogen, that is to say, by two acyl groups replacing the two N-hydrogens of a primary amine.

The compounds of the invention accordingly may be represented by the general formula

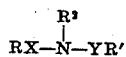

in which RX— and R'Y—, which may be the same or different, are acyl radicals and R² is the radical of a primary amine. X and Y are the acyl-determinants, that is to say, they are the groups which determine the character of the acyl group. For example, if

the acyl group

is determined as carboxylic acyl; if

as thiocarboxylic acyl; or if

as sulfonic acyl. The Rs may be individually separate as in the case of open chain imides or they may be linked together as in the case of cyclic imides. Such cyclic imides may contain one or both of the X and the Y in the ring and may be monocyclic, bicyclic, or polycyclic, and carbocyclic or heterocyclic.

We have found particularly that those cyclic tertiary diacyl amines, which are derived from difunctional organic acids and a primary amine and have two valences of the nitrogen attached to a dibasic-acyl radical, are particularly effective in controlling pestiferous insects especially flies. Compounds of this character which are referred to herein as tertiary dibasic-acyl amines, are obtained by reacting a suitable difunctional acid with a primary amine under conditions appropriate to ring closure. They may be represented by the formula

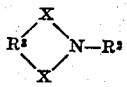

in which —XR³Y— is a dibasic-acyl radical and R² is the radical of the primary amine.

In the formulae illustrated above R² is the radical of a primary amine, illustrative examples of which include methyl, ethyl, isopropyl, n-propyl, n-isobutyl, n-butyl, n-amyl, mixed amyl, n-heptyl, n-octyl, n-dodecyl, cyclohexyl, benzyl, phenyl, ortho-ethoxyphenyl, ortho-xylidyl, ortho-tolyl, mixed ortho-, meta- and para-tolyl, para-dodecylphenyl, ortho-nitrophenyl, meta-nitrophenyl, para-nitrophenyl, ortho-biphenyl, para-biphenyl, 2-ethyl-hexyl, (1,3-phenylene)diphenyl-alpha-chloro, (2-biphenylyl), 2(4-phenyl-thiazolyl), alpha-naphtha, 3-chloro-2,4-hexadienyl, methallyl, allyl, beta-hydroxyethyl, beta-cyanoethyl, omega-cyanopentyl, 5,5,5-trichloro-2-pentenyl, and vinyl.

Primary amines such as listed above may be reacted under appropriate conditions with a wide variety of acids to give imides, or more simply tertiary diacyl amines, which according to the selection of the acid and amine may be cyclic or acyclic and may contain similar or dissimilar acyl groups. Suitable acids are succinic, phenyl succinnic, glutaric, maleic, phthalic, tetrahydrophthalic, hexahydrophthalic, homophthalic, ortho-sulfobenzoic, ortho-sulfophenyl acetic, quinolinic and cinchomeronic, glutaconic, thiodiglycollic, iminodiacetic, diglycollic, N-methyl iminodiacetic, citraconic, dihydrophthalic, 3-6-endomethylene-4-cyclohexene-1,2-dicarboxylic, 3-6-endoethylene-4-cyclohexene-1,2-dicarboxylic, diphenic, aconitic, citric, tricarballylic, itaconic, dithiophthalic, monothiophthalic, dithiosuccinic, ethane disulfonic, beta-sulfopropionic, paratoluene sulfonic, benzene sulfonic, and alkyl sulfonic such as butyl and decyl, and various of the fatty acids such as isobutyric, isovaleric, and lauric.

The invention may be more fully understood by reference to particular preferred types of tertiary diacyl amines obtainable from the interaction of primary amines and appropriate acids. Thus according to one preferred form of the invention a primary amine and a difunctional acid in which the functional groups are linked together by a carbon chain of preferably two but not more than three carbon atoms are reacted to give a tertiary dibasic-acyl amine in which $R^3$ of the dibasic-acyl group —$XR^3Y$— is an organic radical linking X and Y together by a carbon chain of preferably two but not more than three carbon atoms. Such dibasic-acyl groups are characteristic of the following typical acids: succinic, phenyl succinic, glutaric, maleic, citraconic, mesaconic, pyrocinchonic, ethyl methyl maleic, aconitic, citric, tricarballylic, itaconic, glutaconic, dithiosuccinic, ethane disulfonic, beta-sulfopropionic, phthalic, dihydrophthalic, tetrahydrophthalic (4-cyclohexene-1,2-dicarboxylic), hexahydrophthalic (cyclohexane-1,2-dicarboxylic), homophthalic, mono- and di-thiophthalic, ortho-sulfobenzoic, ortho-sulfophenyl acetic, quinolinic, cinchomeronic, 3-6-endomethylene-4-cyclohexene-1,2-dicarboxylic, 3-6-endoethylene-4-cyclohexene-1,2-dicarboxylic and 3,6-endomethylene cyclohexane-1,2-dicarboxylic, 3,6-endomethylene-2-methyl-4-cyclohexene-1,2-dicarboxylic, 7-methyl-3,6-endomethylene, 4-cyclohexene-1,2-dicarboxylic, 3-methyl-4-cyclohexene-1,2-dicarboxylic, 3-methyl-6-carbobutoxy-4-cyclohexene-1,2-dicarboxylic and 3,6-endoethylene-3-isopropyl-6-methyl-4-cyclohexene-1,2-dicarboxylic. The acids having ortho-functional groups are preferred because they give the 5-membered dibasic-acyl amine ring structure.

Succinic, glutaric, maleic and glutaconic acids are typical of the acyclic acids which give monocyclic compounds. From these 5- and 6-membered saturated and unsaturated dibasic-acyl amino ring structures are obtainable. Such structures as are obtainable from acids of the maleic acid and glutaconic series are preferable because of the ethylenic unsaturation in the carbon chain linking the two functional groups. In forming imides from these acyclic acids it is desirable to use an amine which also is acyclic, and preferably an alkyl amine containing less than 12 carbon atoms.

The phthalic acids, the reduced phthalic acids, the pyridine dicarboxylic acids and the alicyclic dicarboxylic acids listed above are typical of cyclic acids which may be used in producing polycyclic compounds according to the invention. The cyclic acids may be carbocyclic or heterocyclic but preferably are alicyclic ortho-dicarboxylic acids. Here too non-benzenoid unsaturation in a carbon chain linking the two functional groups is desirable. The alicyclic group is preferably bicyclic and made up of two fused 5-membered rings as in the case of (2,2,1)bicyclo-4-heptene-1,2-dioic acid (3,6-endomethylene-4-cyclohexene-1,2-dicarboxylic acid). In producing imides from these cyclic acids it is desirable to use acyclic amines, especially alkyl amines containing less than 8 carbon atoms.

By selecting suitable acids and amines as outlined above there may be obtained a wide variety of compounds coming within the scope of the invention which in general may be either solids or oils and stable, colorless, relatively odorless, insoluble in water and soluble in most organic solvents such as acetone, alcohol, ether, benzene, kerosene and certain other hydrocarbon solvents. In general such compounds may be prepared as described above and more particularly illustrated below by the interaction of the appropriate acid ester or anhydride with the desired amine either alone or in the presence of solvents such as benzene or other indifferent solvents.

The invention may be more fully understood by reference to the following examples illustrating suitable methods of preparing typical compounds. The parts are by weight.

EXAMPLE 1

Preparation of the N-(n-butyl) imide of 3,6-endomethylene-4-cyclohexene-1,2-dicarboxylic acid

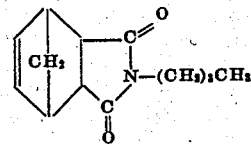

The anhydride of the above acid is first prepared by bubbling 66 g. of freshly distilled cyclopentadiene monomer (B. P. 41° C.) below the surface of a mixture of 98 g. of maleic anhydride and 200 cc. of benzene at ordinary room temperature and injecting the cyclopentadiene as rapidly as is consistent with adequate reflux to prevent loss of reactants. This operation is complete in 15-20 minutes.

73 grams of dry n-butylamine is then added as rapidly as reflux capacity will permit. Water is removed from this mixture in an apparatus for refluxing and distilling, separating the water and return of benzene to the reaction pot. After removable of 16.5 cc. of water by this procedure, the benzene is distilled from the product leaving a residue with an acid number of 9.5. This crude acidic material, amounting to 214 g. is purified by direct distillation or by first alkaline scrubbing and then distillation. A satisfactory product for insecticidal use is obtained by scrubbing the crude acidic material with a slight excess of the theoretical amount of 5% sodium hydroxide solution, which results in a loss of approximately 6-8% in the weight of the product. This substantially neutral product is on further purification by distillation from a modified Claisen flask found to possess a boiling point of 134–137° C./2 mm., giving 186 g. of a colorless oil which soon solidifies to a white solid, melting at 42–44° C. ($n_D^{40°C}$=1.5030).

Other analogues are produced by substituting for n-butylamine such amines as methyl, ethyl, propyl, isopropyl, isobutyl, n-amyl, mixed amyl, n-heptyl, n-octyl, n-dodecyl, cyclohexyl, benzyl, phenyl (aniline), orthoethoxyphenyl, ortho-xylidyl, beta-hydroxyethyl, beta-cyanoethyl, allyl and omega-cyanopentyl amine. Similarly other analogues are produced by substituting for the cyclopentadiene other dienes which react with maleic acid to give alicyclic ortho-dicarboxylic acids such as 3,6-endomethylene-cyclohexane-1,2-dicarboxylic acid, 3,6-endomethylene-2-methyl-4-cyclohexene - 1,2 - dicarboxylic acid, 7-methyl-3,6-endomethylene-4-cyclohexene- 1,2-dicarboxylic acid, 4-cyclohexene-1,2-dicarboxylic acid, 3-methyl-4-cyclohexene-1,2-dicarboxylic acid, 3-methyl-6-carbobutoxy-4-cyclohexene-1,2-dicarboxylic acid, cyclohexane-1,2-dicarboxylic acid, and 3,6-endoethylene-3-isopropyl-6-methyl-4 - cyclohexene - 1,2-dicarboxylic acid.

20 minutes and a pale yellow powder melting at 209–210 was recovered by filtration, washing and drying. A mixture of 57.4 g. (0.3 mole) of N-phenyl maleamic acid (maleanilic acid), 10 g. (0.12 mole) of fused sodium acetate, and 102.1 g. (1 mole) of acetic anhydride was heated with stirring on a steam bath. When the temperature of the mixture had reached 80° C. all of the N-phenyl maleamic acid had gone into solution and the bath was dropped. The temperature continued to rise to a maximum of 92° C. from the heat of the reaction. The reaction mixture was allowed to cool to room temperature (one hour) and then poured slowly into a stirred ice-water slurry (800 c. c.). The yellow crystalline precipitate was filtered off, washed well with water, and dried in vacuo over $P_2O_5$. The yield was 44 g. (85%) of yellow crystalline powder melting at 90–1° C.

Other analogues are produced by substituting for the aniline such amines as phenyl, n-dodecyl, p-ethoxyphenyl, alpha-naphthyl, o-tolyl, m-tolyl, p-tolyl, mixed o-, m- and p-tolyl, p-dodecyl phenyl, o-nitrophenyl, m-nitrophenyl, p-nitrophenyl, o-biphenyl, p-biphenyl, 2-ethylhexyl, and

TABLE I

Imides of 3,6-endomethylene-4-cyclohexene-1,2-dicarboxylic acid

| | | |
|---|---|---|
| N-methyl | M. P. 105–107° C | |
| N-ethyl | M. P. 77–79° C | Found N, 7.74% |
| N-isopropyl | M. P. 89–90° C | Found N, 7.26% |
| N-n-propyl | B. P. 133° C./2 mm | Found N, 6.71% |
| N-n-isobutyl | M. P. 88–89° C | |
| N-n-butyl | M. P. 42–44° C | Found N, 6.30% |
| N-n-amyl | B. P. 145–153° C./2 mm | Found N, 6.32% |
| N-mixed amyl [1] | B. P. 144–148° C./3 mm | Found N, 5.98% |
| N-n-heptyl | B. P. 168° C./2 mm | Found N, 5.55% |
| N-n-octyl | B. P. 181–185° C./2 mm | Found N, 5.25% |
| N-n-dodecyl | Viscous oil | Found N, 5.45% |
| N-cyclohexyl | M. P. 157–158° C | Found N, 4.65% |
| N-benzyl | M. P. 60–62° C | Found N, 6.10% |
| N-phenyl | M. P. 135–136° C | Found N, 6.16% |
| N-o-ethoxyphenyl | M. P. 114–115° C | Found N, 5.51% |
| N-o-xylidyl | M. P. 157–158° C | Found N, 4.78% |
| N-beta-hydroxyethyl | B. P. 173–180° C./3 mm | Found N, 4.75% |
| N-beta-cyanoethyl | M. P. 113–115° C | Found N, 6.86% |
| N-allyl | B. P. 125–127° C./2 mm | Found N, 13.51% |
| N-omega-cyanopentyl | M. P. 54–58° C | Found N, 6.81% |
| N-n-amyl 3,6-endomethylene-cyclohexane-1,2-dicarboxylic imide | B. P. 135–141° C./3 mm | |
| N-n-butyl 3,6-endomethylene-cyclohexane-1,2-dicarboxylic imide | B. P. 124–128° C./2 mm | |
| N-n-butyl-7-methyl-3,6-endomethylene-4-cyclohexene-1,2-dicarboxylic imide | B. P. 152–155° C./5 mm | Found N, 5.69% |
| N-n-butyl-4-cyclohexene-1,2-dicarboxylic imide | B. P. 121–122° C./2 mm | Found N, 5.86% |
| N-n-butyl-3-methyl-4-cyclohexene-1,2-dicarboxylic imide | B. P. 122–129° C./2 mm | Found N, 6.68% |
| N-methyl-3-methyl-6-carbobutoxy-4-cyclohexene-1,2-dicarboxylic imide | M. P. 78–79° C | Found N, 6.26% |
| N-n-butyl-cyclohexane-1,2-dicarboxylic imide | B. P. 134–135° C./2 mm | Found N, 5.02% |
| | | Found N, 6.77% |

Imides of 3,6-endoethylene-3-isopropyl-6-methyl-4-cyclohexene-1,2-dicarboxylic acid

| | |
|---|---|
| N-methyl | Found N, 3.87% |
| N-allyl | Found N, 4.62% |
| N-n-butyl | Found N, 4.61% |
| N-cyclohexyl | Found N, 4.24% |
| N-n-dodecyl | Found N, 3.34% |
| N-phenyl | Found N, 3.90% |

[1] A proprietary product, Sharples Solvent Corp., consisting of a mixture of various isomers as tert.-amyl, sec.-amyl, isoamyl, n-amyl, active-amyl amines and 2- and 3-amino pentane.

EXAMPLE 2

*Preparation of N-phenyl maleimide*

N-phenyl maleamic acid was prepared by stirring 186.2 grams of aniline into a solution of 198.2 grams of maleic anhydride in 1500 cc. of chloroform at 15 to 20° C. Stirring was continued for (1,3-phenylene) diamine. Similarly other analogues are produced by substituting for maleic anhydride various other acids of the maleic acid series or their anhydrides such as citraconic, mesaconic, pyrocinchonic (dimethyl maleic), ethylmethyl maleic, aconitic, etc.

The following are typical of such analogues:

TABLE II

| | | |
|---|---|---|
| N-phenyl maleimide | M. P. 90–91° C | |
| N-n-dodecyl maleimide | M. P. 56–57° C | |
| N-p-ethoxyphenyl maleimide | M. P. 75–76° C | Found N, 5.70% |
| N-alpha-naphthyl maleimide | M. P. 116–117° C | Found N, 5.33% |
| N-o-tolyl maleimide | M. P. 70–71° C | |
| N-m-tolyl maleimide | B. P. 142–145° C./2 mm | Found N, 7.54% |
| N-p-tolyl maleimide | M. P. 149–150° C | Found N, 7.68% |
| Mixture of N-o-, N-m-, N-p-tolyl maleimides | | Found N, 7.55% |
| N-p-dodecylphenyl maleimide | | |
| N-o-nitrophenyl maleimide | M. P. 67–68° C | Found N, 4.27% |
| N-m-nitrophenyl maleimide | M. P. 130–131° C | Found N, 12.96% |
| N-p-nitrophenyl maleimide | M. P. 126–127° C | Found N, 12.77% |
| N-o-biphenyl maleimide | M. P. 167–168° C | Found N, 13.09% |
| N-p-biphenyl maleimide | M. P. 139–140° C | Found N, 5.57% |
| N-2-ethylhexyl maleimide | M. P. 139–140° C | Found N, 5.76% |
| N,N'-(1,3-phenylene)dimaleimide | B. P. 128–131° C./8 mm | Found N, 6.47% |
| | M. P. 193–199° C | Found N, 10.17% |

TABLE III

| Compound | B.P./M.P. | Analysis |
|---|---|---|
| N-n-butyl maleimide | B. P. 81–84° C./3 mm | |
| N-vinyl succinimide | M. P. 48.5° C | Found N, 6.99% |
| N-n-octyl succinimide | B. P. 139–142° C./2 mm | Found N, 5.11% |
| N-n-dodecyl succinimide | M. P. 54–55° C | Found N, 7.46% |
| N-n-benzyl succinimide | M. P. 103.5–105° C | Found S, 12.13% |
| N-2(4-phenylthiazolyl)succinimide | M. P. 163–164° C | Found N, 4.92% |
| N-(2-biphenylyl)succinimide | M. P. 127–128° C | Found N, 8.83% |
| N-n-amyl succinimide | B. P. 112–113° C./4 mm | |
| N-phenyl-alpha-chloro-succinimide | M. P. 116–117° C | |
| N-vinyl phthalimide | M. P. 82.6° C | Found N, 3.96% |
| N-n-dodecyl phthalimide | M. P. 64–65° C | Found N, 6.78% |
| N-cyclohexyl phthalimide | M. P. 167–168° C | Found N, 7.36% |
| N-methallyl phthalimide | M. P. 79–80° C | |
| N-alpha-naphthyl phthalimide | M. P. 179–181° C | Found N, 5.33% |
| N-o-ethoxyphenyl phthalimide | M. P. 123–124° C | Found N, 5.34% |
| N-3-chloro-2,4-hexadienyl phthalimide | M. P. 119–120° C | Found N, 5.41% |
| N-mixed amyl homophthalimide | B. P. 163–168° C./3 mm | |
| N-ethyl saccharin | M. P. 94–95° C | |
| N-allyl saccharin | M. P. 93–94° C | Found S, 14.11% |
| N-n-amyl saccharin | | |
| N-n-dodecyl saccharin | M. P. 50–51° C | Found N, 9.07% |
| N-benzyl saccharin | M. P. 109–110° C | |
| N-5,5,5-trichloro-2-pentenyl saccharin | M. P. 109–110° C | Found Cl, 29.97% |
| N-carbohexoxymethyl saccharin | M. P. 55–56° C | Found S, 9.63% |
| [3-(n-amyl)]5-methyl-5-isobutyl hydantoin | B. P. 157–162° C./3 mm | Found N, 11.47% |
| N-acetyl-N-isobutyl valeramide | B. P. 76–78° C./3 mm | Found N, 6.96% |

We are aware that various imides have been suggested as insecticides, fungicides or bactericides, but we are not aware that the tertiary diacyl amines of this invention have ever been considered to be, or thought to be, or suggested to be of value for the control of insect pests. Thus in U. S. Patent 2,205,558 imides of maleic acid are suggested as bactericides and fungicides. Bactericides and fungicides, however, are a different field from that of the present invention and compounds as a rule useful in one are not useful in the other. In U. S. Patent 2,119,701 mercuriated imides are suggested as disinfectants and fungicides. These compounds however are salts of secondary diacyl amines. In U. S. Patent 1,961,840 2,4-diketo-tetrahydrothiazole is disclosed to have insecticidal properties. Also, in British Patent 407,356 there are disclosed certain mixed carboxylic and sulfonic acid imides as ingredients of mothproofing compositions. In such compounds, however, as previously noted, the N-hydrogen is alpha to two strongly negative carbonyl groups and as such has salt-forming properties possibly by reason of the fact that the hydrogen wanders, yielding a tautomeric enol form. In U. S. Dept. of Agriculture Circular No. 523 on the "Toxicity of Certain Organic Insecticides to Codling Moth Larvae in Laboratory Tests," there is reported inconclusive tests of phthalimide as codling moth control. In Journal of Industrial and Engineering Chemistry 19, 1175 (1927) potassium phthalimide is reported ineffective for mothproofing. In Journal of Economic Entomology 33, 669 (1940) nitro and bromo phthalimides are reported ineffective against screw-worms and in U. S. Dept. of Agriculture Bulletin No. 1160, "Studies on Contact Insecticides," succinimide is reported ineffective against *Aphis rumicis.* The imides of these publications, unlike the imides of the invention, are characterized by a highly reactive N-hydrogen. Moreover, the teachings of these publications are essentially negative.

Our invention is particularly directed to the control of flies. The control of these pests, especially in the household, has almost exclusively been effected heretofore by pyrethrum fly sprays. For the past several years efforts have been made to introduce organic thiocyanates into this field but without much success until the current emergency restricted supplies of pyrethrum. These thiocyanate sprays, however, while extremely effective do not have the desirable characteristics of pyrethrum sprays and are tolerable in household sprays only under the conditions of the war emergency.

Even so, there are applications which require pyrethrum in which the organic thiocyanates are undesirable. Thus pyrethrum activated by a synergist, sesame oil, is required in the new Aerosol sprays and pyrethrum activated by a synergist, N-isobutylundecylenamide, is required in delousing. Materials therefore which will step up efficiency of the pyrethrum insecticides or replace part of the pyrethrum are much needed to conserve our limited supply of pyrethrum.

The active agents of this invention are such materials. They increase the efficiency of pyrethrum insecticides in varying degrees according to the particular imide employed and in the same measure permit reduction in pyrethrum content. Some of the more effective materials, such as the n-butyl and n-amyl imides of 3,6-endomethylene-4-cyclohexene-1,2-dicarboxylic acid, are substantially more effective in being able to displace pyrethrum in fly sprays than such known synergists as N-isobutylundecylenamide.

Pyrethrum fly sprays contain a minimum of 100 mgs. pyrethrins per 100 cc. of fly spray base oil such as Deobase (refined kerosene). Such is the composition of the official test insecticide used as a standard of comparison in the industry. According to this invention it is possible to replace as much as 90% or more of the pyrethrins with a suitable imide and still obtain the same paralytic and lethal effects, and to replace as much as 95% or more of the pyrethrins and still obtain the same lethal effect without excessive reduction of paralytic effect. Preferred compositions according to the invention accordingly may contain from about 5 to about 100 mgs. pyrethrins together with considerable quantity of the imide dissolved in a fly spray base.

In such compositions, using the more active imides according to the invention, results comparable to the official test insecticide may be obtained by replacing pyrethrum by imides in the ratio of approximately 10 parts of imide for each part of pyrethrum replaced. The compositions of the invention accordingly may contain as a bare minimum from about 5 to about 100 mgs. per 100 cc. pyrethrum and at least from about 10(100−P) mgs. imide per 100 cc. where P equals mgs. of pyrethrum per 100 cc. with maximum of imide limited only by the solubility of the imide in the fly spray base. If a concentrate is sold for preparing fly sprays as above indicated another factor, namely, the dilution factor is involved and the formula for the minimum amount of imide would be 10(100X−P) mgs. per 100 cc. where P is the amount of pyrethrum in mgs. per 100 cc. and X is the dilution factor, i. e., the volume ratio of fly spray to concentrate. For instance, if the concentrate were intended to be diluted 19 to 1 it would have a dilution factor of 20.

The following tables, illustrating some of the more effective imides according to the invention, are given by way of illustration:

FLY SPRAY TESTS ON REPRESENTATIVE CLASSES OF IMIDES

TABLE IV

|  | Compound at 2% Amount of Pyrethrum | | | Controls, Pyrethrum | | | |
|---|---|---|---|---|---|---|---|
|  | None | 30 mg. | 40 mg. | None | 30 mg. | 40 mg. | 100 mg. |
| IMIDES OF 3,6-ENDOMETHYLENE-4-CYCLOHEXENE-1,2-DICARBOXYLIC ACID | | | | | | | |
| N-methyl | 83–28 | 96–91 |  | 10–0 | 88–6 |  |  |
| N-ethyl | 77–35 | 96–88 |  | 10–0 | 88–6 |  |  |
| N-isopropyl | 58–34 | 94–88 |  | 10–0 | 88–6 |  |  |
| N-n-propyl | 73–52 | 96–93 |  | 10–0 | 88–6 |  |  |
| N-isobutyl | 61–14 | 98–80 |  | 3–0 | 81–2 |  |  |
| N-n-butyl | 85–34 | 95–91 |  | 3–0 | 81–2 |  |  |
| N-n-amyl | 85–45 | 98–72 |  | 3–0 | 81–2 |  |  |
| N-mixed amyl |  |  | 93–87 |  |  |  | 98–45 |
| N-heptyl | 60–13 | 95–60 |  | 10–0 | 88–6 |  |  |
| N-octyl |  |  | 95–58 |  |  | 82–6 | 98–30 |
| N-n-dodecyl | 18–0 | 93–45 |  | 5–0 | 81–2 |  |  |
| N-cyclohexyl | 26–1 | 96–25 |  | 3–0 | 81–2 |  |  |
| N-benzyl** |  |  | 97–87 |  |  |  |  |
| N-phenyl** |  |  | 97–87 |  |  | 82–6 | 98–30 |
| N-ethoxy phenyl |  |  | 94–60 |  |  | 82–6 | 98–30 |
| N-o-xylidyl |  |  | 97–20 |  |  |  | 98–43 |
| N-beta-cyanoethyl | 30–2 | 92–58 |  | 10–0 | 88–6 |  | 98–43 |
| N-allyl | 65–47 | 95–93 |  | 11–0 | 83–3 |  |  |
| N-omega cyanoamyl | 33–1 | 78–31 |  | 11–0 | 83–3 |  |  |

NOTE.—The first figure in the above columns represents paralysis after 10 minutes, and the figure after the hyphen represents the per cent killed after 24 hours according to the Standard Peet-Grady method of evaluation.

The 100 milligram pyrethrum control is the official test insecticide. In the other instances the carrier or fly spray base is a proprietary refined kerosene (Deobase).

The data in the first column (without pyrethrum) were taken in a modification of the Peet-Grady test differing principally in the volume of spray (15 cc.) and time of exposure (15 minutes) as well as the classification of paralyzed flies.

A number of the above imides were insoluble at 2% in Deobase-kerosene and required the assistance of a blending solvent to complete solution. Ten per cent dioxane was used in connection with the compounds marked with (*) in order to formulate a satisfactory 2% solution. Approximately 20% dioxane was used in connection with those compounds marked with () and approximately 30% dioxane with those marked with (*).

TABLE V

*Miscellaneous cycloaliphatic imides*

|  | Compound at 2%, Amount of Pyrethrum | | | Controls, Pyrethrum | | | |
|---|---|---|---|---|---|---|---|
|  | None | 30 mg. | 40 mg. | None | 30 mg. | 40 mg. | 100 mg. |
| N-n-butyl-3,6-endomethylene-2-methyl-4-cyclohexene-1,2-dicarboxylic-imide | 89–58 | 98–95 |  |  | 79–5 |  |  |
| N-n-butyl-7-methyl-3,6-endomethylene-4-cyclohexene-1,2-dicarboxylic-imide | 85–39 | 99–95 |  |  | 79–5 |  |  |
| N-n-butyl-4-cyclohexene-1,2-dicarboxylic imide | 83–4 | 98–37 |  |  | 79–5 |  |  |
| N-n-butyl-3-methyl-4-cyclohexene-1,2-dicarboxylic imide | 78–7 | 99–38 |  |  | 79–5 |  |  |
| N-n-butyl-cyclohexane-1,2-dicarboxylic imide | 75–3 | 98–20 |  |  | 79–5 |  |  |
| N-n-amyl-3,6-endomethylene-cyclohexane-1,2-dicarboxylic imide |  |  | 93–39 |  |  |  |  |
| N-methyl-3-methyl-6-carbobutoxy-4-cyclohexene-1,2-dicarboxylic imide |  |  | 97–67 |  |  |  | 98–45 |
| N-n-butyl-3,6-endoethylene-3-isopropyl-6-methyl-4-cyclohexene-1,2-dicarboxylic imide** |  |  | 96–36 |  |  |  | 98–45 |
|  |  |  | 93–39 |  |  |  | 98–45 |

NOTE.—The first figure in the above columns represents paralysis after 10 minutes, and the figure after the hyphen represents the per cent killed after 24 hours according to the Standard Peet-Grady method of evaluation.

The 100 milligram pyrethrum control is the official test insecticide. In the other instances the carrier or fly spray base is a proprietary refined kerosene (Deobase).

The data in the first column (without pyrethrum) were taken in a modification of the Peet-Grady test differing principally in the volume of spray (15 cc.) and time of exposure (15 minutes) as well as the classification of paralyzed flies.

A number of the above imides were insoluble at 2% in Deobase-kerosene and required the assistance of a blending solvent to complete solution. Ten per cent dioxane was used in connection with the compounds marked with (*) in order to formulate a satisfactory 2% solution. Approximately 20% dioxane was used in connection with those compounds marked with () and approximately 30% dioxane with those marked with (*).

TABLE VI

| | Compound at 2%, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| IMIDES OF MALEIC ACID | | | | | | | |
| N-n-butyl | | 95-61 | 96-40 | | 94-22 | | |
| N-2-ethyl hexyl | 90-53 | 98-91 | | 0-0 | 87-9 | | |
| N-p-ethoxyphenyl | 47-12 | 93-59 | | 13-0 | 81-2 | | |
| N-n-phenyl** | 72-29 | 97-46 | | 3-0 | 87-9 | | |
| N-alpha-naphthyl | 13-0 | 95-37 | | 13-0 | 99-10 | | |
| N-o-tolyl | 71-55 | 98-91 | | 8-1 | 99-10 | | |
| N-m-tolyl* | 74-57 | 99-90 | | 8-1 | 99-10 | | |
| N-p-tolyl | 6-1 | 94-48 | | 8-1 | 99-10 | | |
| N-mixed o-, m- and p-tolyl | 1-0 | 93-14 | | 8-1 | 94-22 | | |
| N-p-n-dodecylphenyl | 0-0 | 98-42 | | 0-0 | 94-22 | | |
| N-o-nitrophenyl | 1-0 | 94-38 | | 0-0 | 94-22 | | |
| N-m-nitrophenyl | 2-0 | 96-46 | | 0-0 | 94-22 | | |
| N-o-biphenyl | 34-2 | 98-14 | | 3-0 | 81-2 | | |
| N-vinyl phthalimide | | | 95-43 | | | 82-6 | 98-30 |
| N-methallyl phthalimide*** | | | | | | | |
| N-cyclohexyl phthalimide | 13-0 | 98-21 | | 2-0 | 81-2 | | 98-38 |
| N-o-ethoxyphenyl phthalimide | | | 90-25 | | | | |

Note.—The first figure in the above columns represents paralysis after 10 minutes, and the figure after the hyphen represents the per cent killed after 24 hours according to the Standard Peet-Grady method of evaluation.

The 100 milligram pyrethrum control is the official test insecticide. In the other instances the carrier or fly spray base is a proprietary refined kerosene (Deobase).

The data in the first column (without pyrethrum) were taken in a modification of the Peet-Grady test differing principally in the volume of spray (15 cc.) and time of exposure (15 minutes) as well as the classification of paralyzed flies.

A number of the above imides were insoluble at 2% in Deobase-kerosene and required the assistance of a blending solvent to complete solution. Ten per cent dioxane was used in connection with the compounds marked with (*) in order to formulate a satisfactory 2% solution. Approximately 20% dioxane was used in connection with those compounds marked with () and approximately 30% dioxane with those marked with (*).

TABLE VII

Miscellaneous imides

| | Compound at 2%, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| N-n-vinyl succinimide | | 96-13 | | | 96-17 | | 98-44 |
| N-n-amyl succinimide | | | 97-25 | | | | |
| N-n-octyl succinimide | 95-13 | | | 2-0 | 81-2 | | 98-44 |
| N-n-dodecyl | | | 94-28 | | | | |
| N-phenyl-alpha chloro succinimide | 24-0 | 94-30 | | 13-0 | 87-9 | | |

TABLE VIII

Miscellaneous imides

| | Compound at 2%, Amount of Pyrethrum | | | Controls, Pyrethrum | | | |
|---|---|---|---|---|---|---|---|
| | None | 30 mg. | 40 mg. | None | 30 mg. | 40 mg. | 100 mg. |
| N-ethyl saccharin | | | 90-48 | | | 80-6 | 98-31 |
| N-allyl saccharin** | | | 94-86 | | | 80-6 | 98-31 |
| N-n-amyl saccharin** | | | 96-53 | | | 80-6 | 98-31 |
| N-benzyl saccharin | | | 92-24 | | | 80-6 | 98-31 |
| Mixed N-amyl-homophthalimide | 26-0 | 98-38 | | | 93-6 | | |

Note.—The first figure in the above columns represents paralysis after 10 minutes, and the figure after the hyphen represents the per cent killed after 24 hours according to the Standard Peet-Grady method of evaluation.

The 100 milligram pyrethrum control is the official test insecticide. In the other instances the carrier or fly spray base is a proprietary refined kerosene (Deobase).

The data in the first column (without pyrethrum) were taken in a modification of the Peet-Grady test differing principally in the volume of spray (15 cc.) and time of exposure (15 minutes) as well as the classification of paralyzed flies.

A number of the above imides were insoluble at 2% in Deobase-kerosene and required the assistance of a blending solvent to complete solution. Ten per cent dioxane was used in connection with the compounds marked with (*) in order to formulate a satisfactory 2% solution. Approximately 20% dioxane was used in connection with those compounds marked with () and approximately 30% dioxane with those marked with (*).

The data given in the following table are illustrative of compositions containing various mixtures of n-butyl imide of 3,6-endomethylene-4-cyclohexene-1,2-dicarboxylic acid with pyrethrum. These compositions are comparable in efficiency to the standard 100 mg. fly sprays (class B), or the equivalent, which are available on the open market. The data illustrate the marked synergism of the imide pyrethrum mixtures. If only the additive effects were involved the composition curve would be a linear one, ranging from the 2000 mgs. or more of the imide required to equal the kill of the 100 mg. pyrethrum spray to the 100 mgs. of pyrethrum. Hence the theoretical composition may easily be calculated, for example, if the mixture contains 40% pyrethrum (40 mg.) it should contain 60% imide or 1200 mgs. It will be observed from the data given in the table that actually less than one-half of that amount of imide is required. This is indicative of a very marked synergism.

TABLE IX

| Actual Composition, Mg./100 cc. | | Calculated Theoretical Composition | | Percentage Control | Percentage Kill Over and Above Standards | |
|---|---|---|---|---|---|---|
| Imide | Pyrethrum | Imide | Pyrethrum | | OTI | PTI |
| 0 | 100 | | | [1] 98–28 | 0 | +9 |
| 0 | 100 | | | 98–35 | 0 | 0 |
| 0 | 100 | | | 98–41 | 0 | 0 |
| 0 | 100 | | | 98–44 | 0 | −4 |
| 0 | 100 | | | 98–37 | 0 | 0 |
| 0 | 100 | | | [1] 98–26 | 0 | +8 |
| 420 | 40 | 420 / 1,200 | 79 / 40 | 98–30 | [1] +4 | −4 |
| 550 | 40 | 550 / 1,200 | 72 / 40 | 97–35 | +7 | −2 |
| 780 | 28 | 780 / 1,440 | 61 / 28 | 97–34 | +6 | −3 |
| 1,000 | 20 | 1,000 / 1,600 | 50 / 20 | 97–43 | +5 | +5 |
| 1,000 | 15 | 1,000 / 1,700 | 50 / 15 | 97–46 / 96–41 | +5 / [1]+13 | +5 / +4 |
| 1,250 | 4 | 1,750 / 1,920 | 37 / 4 | 93–48 | 0 | −2 |
| 2,000 | 0 | | | 83–34 | 0 | 0 |
| 2,000 | 0 | | | 63–36 | 0 | −3 |

OTI = Official Test Insecticide (100 mgs. pyrethrum).
PTI = Proprietary Test Insecticide (pyrethrum activated with N-isobutylamide of undecylenic acid).
[1] Kill for OTI unusually low.

While the imides of this invention are particularly useful for the control of flies and like pests subject to control by household sprays, the invention is not so limited because many of the imides show toxicity, though in a lesser degree, to other insects such as red spider, aphids, clothes moths and Mexican bean beetles. For example, when applied to bean plants infested with Mexican bean bettle larvae N-allyl-3,6-endomethylene-3-isopropyl-6-methyl-4-cyclohexene-1,2-dicarboxylic imide gave 83% kill with only 2% defoliation; methallyl phthalimide gave 93% kill and 5% defoliation; N-n-butyl-3,6-endomethylene-2-methyl-4-cyclohexene-1,2-dicarboxylic imide gave 100% kill and 0% defoliation; N-isobutyl-3,6-endomethylene-4-cyclohexene-1,2-dicarboxylic imide gave 87% kill and 0% defoliation; N-n-butyl-3,6-endomethylene-4-cyclohexene-1,2-dicarboxylic imide gave 100% kill and 0% defoliation; N-phenyl maleimide gave 90% kill and 1% defoliation; N-n-amyl-3,6-endomethylene-4-cyclohexene-1,2-dicarboxylic imide gave 83% kill and 0% defoliation and was equally effective at one half concentration; N-benzyl-3,6-endomethylene-4-cyclohexene-1,2-dicarboxylic imide gave 100% kill and 0% defoliation and gave equal results at one-half the concentration; N-ethyl saccharin gave 100% kill and 5% defoliation and equal results at one half the concentration; N-allyl saccharin gave 100% kill and 0% defoliation and substantially the same results at one half the concentration; N-n-butyl-7-methyl-3,6-endomethylene-4-cyclohexene-1,2-dicarboxylic imide gave 100% kill and 0% defoliation; N-n-butyl-hexahydrophthalimide gave 97% kill and 0% defoliation; and N-o-tolyl maleimide gave 83% kill and 0% defoliation.

It will be understood, however, that the compounds of the invention may be incorporated in various compositions according to the requirements of control of the particular pest involved. They should be incorporated in such compositions in a fine state of dispersion in a suitable carrier which may be a liquid or a finely divided solid. The dispersed particles should be less than 40 microns in size. If the carrier is an inert solid, particles of the carrier also should be less than 40 microns. The dispersion may be either a molecular dispersion, a micellar dispersion, or a physical dispersion. In the first of these the particles will be dispersed as molecules or ions, in the second as groups of molecules and in the third as discrete particles. There may be incorporated in these compositions, either in the form sold or in the form made up for application, various auxiliary materials such as spreaders, stickers, dispersing agents, flocculating agents and conditioning agents as more particularly set out below.

Thus they may be used in various combinations with such auxiliary materials or adjuvants as spreaders, stickers, diluents or extenders, dispersing agents, and other toxicants as may be most suited to the control of a particular pest or group of pests; for example, insecticides such as metallic arsenates, fluosilicates, phenothiazines, alpha,alpha-di-(parachlorophenyl) beta,beta, beta-trichloroethane and alpha, alpha-di-(para-methoxyphenyl) beta,beta,beta-trichloroethane, organic thiocyanates such as n-dodecyl thiocyanate, fenchyl thiocyanoacetate and butyl Carbitol thiocyanate, nicotine, anabasine (neonicotine), nor-nicotine, rotenone and its congeners, hellebore, pyrethrum, N-isobutylundecylenamide, aminomethyl sulfides, and bactericides and fungicides such as sulfur, polysulfides such as lime-sulfur, the chlorinated phenols, aminomethyl sulfides, copper acyl-acetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long chain quaternary ammonium halides and derivatives of dithiocarbamic acid such as ferric dimethyldithiocarbamate. They may be used in the form of aqueous sprays, dusts or solutions, dispersed with wetting agents such as the alkali metal or amine salts of oleic acid and the sulfated higher alcohols, the sulfonated animal and vegetable oils such as sulfonated fish or castor oils or the sulfonated petroleum oils; with diluents such as calcium phosphate, Bancroft clay, Kaolin, diatomaceous earth, sulfur, lime, pyrophyllite, talc, bentonite, flours such as walnut shell, wheat, redwood, soya bean, cottonseed, or with organic solvents such as trichloroethylene, tetrachlorethylene, Stoddard solvent, and other hydrocarbon solvents. They may be used in vegetable and mineral oil sprays in which petroleum or vegetable oil glycerides are used as contact agents or active poisons. Various adhesive and sticking materials such as rosin and glue and various other common adjuvants such as lime may be used. Such mixtures with insecticides and fungicides and insecticidal and fungicidal adjuvants as are here set out may have particular usefulness in special applications and frequently will give better results than would be anticipated from the killing power or repellent action of each ingredient when used alone.

In general, the active agents of this invention may be formulated in a wide variety of adjuvants as may be best suited to the control of any particular pest or combination of pests, having in mind the nature of the pest, its particular habitat and feeding habits, and its peculiar susceptibilities, if any. Thus suitable compositions may be prepared with the active agent in a state of composition, subdivision, and association with other materials such as have been mentioned, such as may be necessary peculiarly to adapt the active agent to the purpose to be effected.

We claim:

1. A fly spray composition comprising a solution of pyrethrum and an amide of a primary amine and a dicarboxylic acid having an unsaturated aliphatic carbon chain of at least 2 and not more than 3 carbon atoms linking the carboxyl groups, said pyrethrum being present in about five to about 95 milligrams per 100 cc. and said imide being present in the amount of at least about 10(100−P) milligrams per 100 cc. where P is the amount of pyrethrum in milligrams per 100 cc. of the fly spray.

2. A fly spray composition comprising a solution of pyrethrum and an imide of a primary amine and an acylic dicarboxylic acid having an unsaturated aliphatic carbon chain of at least 2 and not more than 3 carbon atoms linking the carboxyl groups, said pyrethrum being present in about 5 to about 95 milligrams per 100 cc. and said imide being present in the amount of at least about 10(100−P) milligrams per 100 cc. where P is the amount of pyrethrum in milligrams per 100 cc. of the fly spray.

3. A fly spray composition comprising a solution of pyrethrum and an imide of a primary amine and maleic acid, said pyrethrum being present in about 5 to about 95 milligrams per 100 cc. and said imide being present in the amount of at least about 10(100−P) milligrams per 100 cc. where P is the amount of pyrethrum in milligrams per 100 cc. of the fly spray.

4. A fly spray composition comprising a solution of pyrethrum and an N-aryl maleimide of the benzene series, said pyrethrum being present in about 5 to about 95 milligrams per 100 cc. and said imide being present in the amount of at least about 10(100−P) milligrams per 100 cc. where P is the amount of pyrethrum in milligrams per 100 cc. of the fly spray.

5. A fly spray composition comprising a solution of pyrethrum and an N-alkyl maleimide containing less than 16 carbon atoms, said pyrethrum being present in about 5 to about 95 milligrams per 100 cc. and said imide being present in the amount of at least about 10(100−P) milligrams per 100 cc. where P is the amount of pyrethrum in milligrams per 100 cc. of the fly spray.

HAROLD W. ARNOLD.
NORMAN E. SEARLE.

REFERENCES CITED

The following references are of record in the file of this patent:

UNITED STATES PATENTS

| Number | Name | Date |
|---|---|---|
| 1,955,207 | Stotter | Apr. 17, 1934 |
| 1,961,840 | Bolton | June 5, 1934 |
| 2,143,816 | Jacobson | Jan. 10, 1939 |
| 2,205,558 | Flett | June 25, 1940 |
| 2,292,998 | Hentrich | Aug. 11, 1942 |

OTHER REFERENCES

Soap and Sanitary Chemicals, Jan. 1943, pages 95–96 by Roarck.